United States Patent
Barenthin et al.

(10) Patent No.: US 11,243,220 B2
(45) Date of Patent: Feb. 8, 2022

(54) INJECTOR MANIFOLD

(71) Applicant: STRATEC Biomedical AG, Birkenfeld (DE)

(72) Inventors: Volker Barenthin, Königsbach-Stein (DE); Tuna Sinangin, Karlsruhe (DE)

(73) Assignee: STRATEG SE, Birkenfeld (DE)

( * ) Notice: Subject to any disclaimer, the term of this patent is extended or adjusted under 35 U.S.C. 154(b) by 135 days.

(21) Appl. No.: 15/710,268

(22) Filed: Sep. 20, 2017

(65) Prior Publication Data

US 2018/0080951 A1    Mar. 22, 2018

(30) Foreign Application Priority Data

Sep. 21, 2016 (GB) ..................... 1616034

(51) Int. Cl.
*G01N 35/10* (2006.01)
*B01L 3/02* (2006.01)

(52) U.S. Cl.
CPC ........ *G01N 35/1004* (2013.01); *B01L 3/0293* (2013.01); *B01L 13/02* (2019.08); *G01N 35/1009* (2013.01); *G01N 35/1065* (2013.01); *B01L 3/021* (2013.01); *B01L 2300/0874* (2013.01); *B01L 2300/0887* (2013.01); *G01N 2035/1048* (2013.01)

(58) Field of Classification Search
CPC ........... G01N 35/1004; G01N 35/1009; G01N 35/1065; B01L 13/02; B01L 3/0293

USPC .......................................... 422/63
See application file for complete search history.

(56) References Cited

U.S. PATENT DOCUMENTS

| | | | | |
|---|---|---|---|---|
| 5,897,837 A | * | 4/1999 | Mizuno | G01N 35/109 422/510 |
| 6,485,690 B1 | * | 11/2002 | Pfost | B01J 19/0046 422/552 |
| 7,192,559 B2 | * | 3/2007 | Chow | B01D 61/18 137/87.01 |
| 7,270,789 B1 | | 9/2007 | Astle | |
| 8,986,614 B2 | * | 3/2015 | Zhou | B01L 3/502738 422/502 |

FOREIGN PATENT DOCUMENTS

| | | |
|---|---|---|
| EP | 0253519 A2 | 1/1988 |
| JP | H07103986 | 4/1995 |
| WO | 2014179584 A1 | 11/2014 |

* cited by examiner

*Primary Examiner* — Matthew D Krcha
*Assistant Examiner* — Jacqueline Brazin
(74) *Attorney, Agent, or Firm* — 24IP Law Group USA, PLLC; Timothy DeWitt

(57) ABSTRACT

A device and method for purification of information or particles from a sample and provides a device for performing washing steps in automated analyzer systems, the device comprising a multilayer unit with liquid channel and valves. The multilayer unit may comprise three layer.

12 Claims, 6 Drawing Sheets

INJECTOR MANIFOLD

CROSS-REFERENCE TO RELATED APPLICATIONS

The present application claims priority of United Kingdom Application No. GB 1616034.3 filed on Sep. 21, 2016. The aforementioned application is herby incorporated by reference in its entirety.

BACKGROUND OF THE INVENTION

Field of the Invention

The field of the invention relates to a device and method for purification of information or particles from a sample.

Brief Description of the Related Art

Automated analyser systems for use in clinical diagnostics and life sciences are produced by a number of companies. For example, the Stratec Biomedical AG, Birkenfeld, Germany, produces a number of devices for specimen handling and detection for use in automated analyser systems and other laboratory instrumentation.

The analytical process in automated analyzer systems usually comprises steps of isolating, washing, purifying and evaluating information of or from a sample. Automated processing is based on using a vessel for storing, transporting and processing the samples inside the analyzer system. Such a vessel is usually called cuvette.

Cuvettes allow processing all necessary steps within their cavity. These steps comprise adding primer and reagents. The cuvettes may furthermore be used for washing steps to purify and isolate the necessary information to get reliable results in the following measuring process.

One possibility to separate the particles of interest from the rest of the sample is to bind them with a special marker. These markers can be small particles with a structure that is able to dock on the molecular geometry of the component of interest within the sample. The other side of this marker has a magnetic component for binding the marker to a magnet. Arranging a magnet on the outside of the cuvette—preferably on one side of the cuvette—the bound or attached molecules will be moved in direction of the magnet, immobilized and kept in position.

A washing buffer has to be applied into and aspirated out of the cuvette during the washing process of a probe. After aspiration the bound magnetic beads form a small spot of particles called bead pellet. This bead pellet that is kept in position by the magnet has to be washed to get rid of waste or residuals. A liquid jet of washing buffer coming out of the injector is injected next to the bead pellet to wash out waste and residuals. The resulting liquid of washing buffer with waste and residuals has to be be aspirated from the cuvette. This washing step will be repeated several times to purify the bead pellet and to prepare them for following processing steps like measuring the number or amount of target molecules.

The efficacy of the washing steps influence the subsequent measuring process and the test results. To ensure a highly effective washing procedure pressure, flow rate and the presence of washing buffer have to be determined. It can also be of interest to monitor physical data of the fluid like temperature or conductivity.

The single components monitoring a washing step are usually locally separated: The pump is located in a pump unit. This unit has tubing connecting it to the valve block. Tubing also connects the valve block with an injector. A bypass might be located between valve block and injector comprising sensors, which also means additional tubing.

Several functionalities for ensuring highly effective washing steps may be integrated into an assembly without local separation, e.g. switching, guiding and monitoring the liquid flow. This reduces the number and length of supply lines.

Disadvantages related to the state of the art can be summarized in that each tubing inside the diagnostic instrument means:

a) Additional liquid, caused by the additional volume of tubing, which means more variables influencing the measuring process.
b) More Power is needed to drive separate units.
c) Additional flow resistance, caused by the orifices and the length of tubing, means the need for a higher output of the pump just to overpower the different resistances. This leads to a lower energy efficiency of the complete system.
d) Increase of dead volume caused by complex routed or kinked tubing, or inside manifolds. The dead volume may also comprise areas without liquid flow. In such areas bubbles may be collected. If the bubbles are big enough they may interfere with determination of volumes with optical sensors.
e) Possible forced bubbling, caused by pressure differences due to orifice change between manifold and tubing leads to a wrong determination of volumes inside the cuvette or may interfere with volume determination by optical sensors. These could be critical for the analytical process.
f) Additional maintenance cost caused by possible spare parts like tubing, manifolds or injectors. These separate units need maintenance service. The more units are present and the more connections between them are necessary, the more cost for servicing will be caused. It is not possible to run the system during maintenance resulting in downtime increasing costs additionally.
g) Possible indirect measuring, caused by the position of the senor in the tubing, leads to insufficient measuring that does not correspond with the data of the point of injection. The accuracy of an assay may be reduced due to such incorrect values.

It is an object of the present invention to provide a device and a method for performing washing steps in an automated analyser system avoiding the disadvantages of the prior art.

BRIEF SUMMARY OF THE INVENTION

The present invention provides a device for performing washing steps in automated analyzer systems, the device comprising a multilayer unit with at least one layer with liquid channel and valves, wherein the at least one layer of the multilayer unit comprises channel for washing buffer separated from channel for rinsing buffer for cleaning aspiration probes that were in contact with liquids from a cuvette or vessel, wherein the aspiration probes are movable arranged within bores of the at least one layer, wherein the aspiration probes are movable along their longitudinal axis so that the rinsing buffer flushes around the aspiration probes for cleaning their parts that were in contact with washing buffer or a sample. The multilayer unit may comprise three layer, an upper layer, a middle layer and a lower layer.

It is intended that the at least one layer or the upper layer of the multilayer unit may comprise tubing sockets, at least one inlet and outlet port for at least one valves and at least one bore for guiding aspiration probes.

The at least one layer or the middle layer of the multilayer unit may comprise bores for guiding aspiration probes and a channel for a rinsing buffer connecting inlet and outlet of the rinsing buffer as well as a surrounding for the at least one bore for guiding aspiration probes.

It is further intended that the at least one layer or the middle layer of the multi-layer unit may additionally comprise at least one inlet for washing buffer and at least one liquid channel connecting the at least one inlet for washing buffer to the at least one valve and at least one injector bore connecting the at least one valve outlet with the at least one injector.

The at least one layer or the lower layer of the multilayer unit may comprise at least one bore for connecting the at least one valve outlet with the at least one injector.

For the at least one layer or the middle and lower layers it is envisaged that they may comprise at least one acceptance for sensors adjacent to the at least one injector bore.

The at least one layer or the upper layer of the multilayer unit may serve for fixing at least one valve and may comprise aspiration probe guiding and glue in sockets for tubing for washing buffer and in- and outlet of rinsing solution.

The device may further comprise at least one sensor for measuring liquid amounts, flow rates, pressure, conductivity or temperature, wherein it is obvious for a person having ordinary skill in the art that the sensors may apply for measuring further physical properties.

It is intended that the at least one sensor is integrated directly in the channel between valve and injector.

Another object of the instant invention is a method for performing washing steps in an automated analyzer system, comprising the steps of
  a) Providing a rinsing buffer for cleaning through a multilayer plate, wherein at least one valve that is mounted to at least one layer of the multilayer plate for injecting the rinsing buffer into a cuvette or vessel;
  b) Aspiration of the rinsing buffer from the cuvette or vessel by at least one aspiration probe that is arranged movable across the multilayer unit;
  c) Moving the aspiration probes along their longitudinal axis through a channel for rinsing buffer;
  d) Cleaning the aspiration probes by flushing them with rinsing buffer.

The method may additionally comprise the step of detecting liquid amounts, flow rates, pressure, conductivity or temperature.

BRIEF DESCRIPTION OF THE DRAWINGS

The invention will be described on the basis of figures. It will be understood that the embodiments and aspects of the invention described are only examples and do not limit the protective scope of the claims in any way. The invention is defined by the claims and their equivalents. It will be understood that features of one aspect or embodiment of the invention can be combined with a feature of a different aspect or aspects and/or embodiments of the invention. It shows:

DETAILED DESCRIPTION OF THE INVENTION

Figure 1:
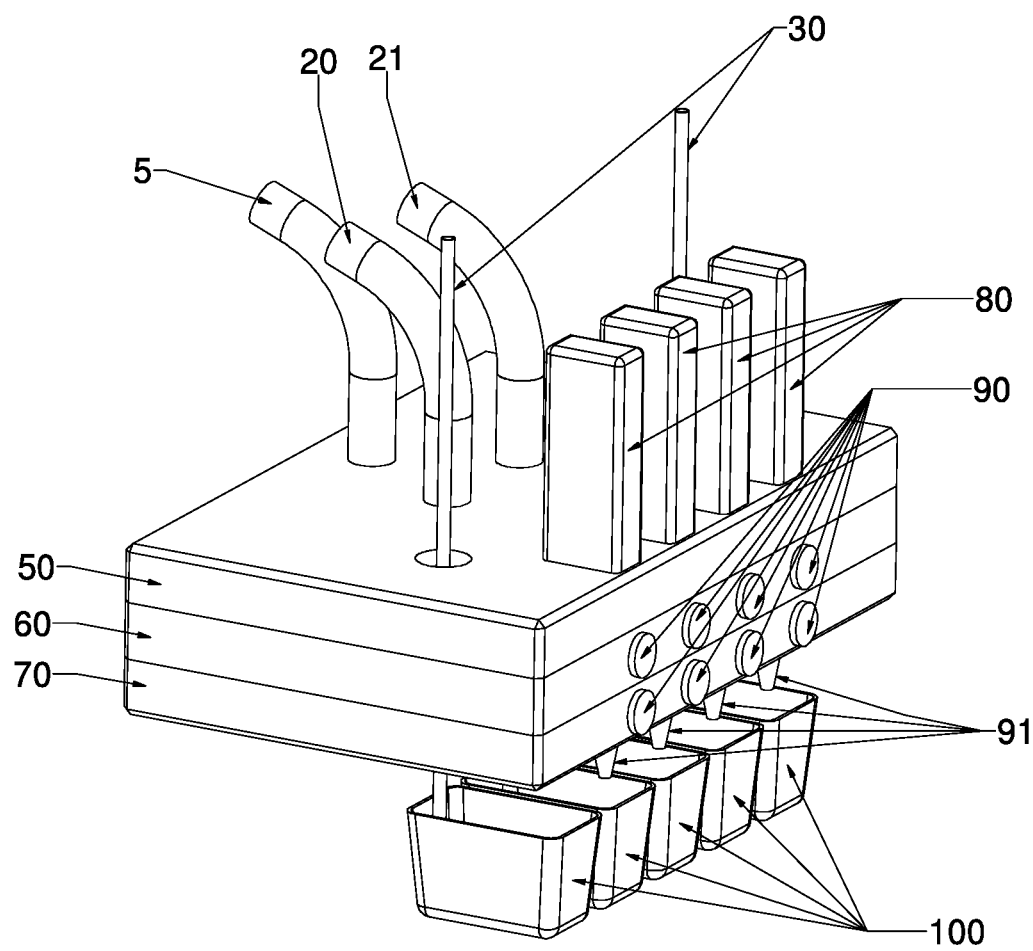
FIG. 1 is a schematic drawing showing the assembled multilayer unit with valves and cuvettes.

The instant invention refers to a device and method for purification of information or particles from a sample.

The term "unit of the automated analyser system" refers to a component, module or apparatus of the automated analyser system that is connected to or an integral part of the system. Such a unit may have its own central processing unit for operating and connection to the system. The words "unit" or "module" are both used synonymously within the instant disclosure.

"Information of a sample" summarizes any information that can be received from a sample like a patient sample by purification and washing steps which can be combined with the use of specific binding components. The presence or absence of components like nucleotides (RNA, DNA), peptides (antibodies), sugars, salts or any other natural or synthetic component may represent such an information. The absence or presence of a pharmaceutical or a component which may cause or be the product of an endocrine reaction is also an information that may be detected using the device or method of the present invention.

Providing a device integrating fluidic system, mechanical components, actuators and electronic components within a space saving unit can summarize the core of the invention. The fluidic system comprises liquid/gas channels, flow control means, separators, buffer/intermediate volumes and injectors. The mechanical components comprise guiding and hinges. The actuators comprise valves and drives like motors. The electronic components comprise flow sensors, temperature sensors, pressure sensors and switches as well as conductivity sensors.

A device of the instant invention comprises basically a multilayer unit with liquid channel, a rinsing device for aspiration means, glue in sockets for supply tubing and a guiding for aspiration means as well as an injector unit with switching valves.

The device may have interfaces to all necessary electronics including printed circuit boards (PCB), sensors and all necessary electronic interfaces like cables and connectors.

The unit has a guiding for aspiration means, which are basically a bore providing a very small gap between aspiration means like a probe or needle and the walls of the bore. The small gap avoids spilling and dripping of washing buffer during the cleaning process of the aspiration means. Sealing may also prevent leakage of washing buffer. The aspiration probe or needle can be moved along its longitudinal axis so that its complete exterior surface that may have been in contact with the probe or washing buffer, can be flushed with rinsing solution for cleaning it.

The multilayer unit has an interface to a supply line to provide the injector with the necessary buffer or liquid, e.g. deionized water, acidic solutions, base solutions, buffers based on sodium chloride or other ions and hydroxide solutions. The multilayer unit provides further interfaces to a supply line for rinsing solution for cleaning the aspiration means, e.g. deionized water to avoid contamination of probes and prevent the formation of crystals caused by the use of highly concentrated salt or sugar comprising solutions. An interface to connect the multilayer to a waste drain is also provided so that rinsing solution can flow to a waste container for instance.

The valves are mounted onto a ground plate of the multilayer unit.

Combining all afore mentioned components results in a small assembly or device that can be easily fixed to an automated analyser system. Such a device is related to the following advantages:

a) On the spot measuring: The sensor can be directly integrated into a channel between valve and injector, an injector nozzle for instance, to avoid influences caused by long tubing.

b) Reduced flow resistance: Valves, injectors, sensors and channels are connected in one integral part, the multilayer unit so that the flow resistance is reduced due to the possibility to avoid sharp edges, diameter changes or narrow radii when designing the shape of the multilayer forming parts.

c) Reduced dead volume: The reduction of liquid lines between connected parts results in a significant reduced dead volume and therefore reduces errors related to dead volumes.

d) Reduced amount of parts: As regards the liquid line, integrating parts into the multilayer unit or one layer of the multilayer unit reduces the total number of parts significantly. In addition the integration of flow or pressure sensors in the multilayer unit also reduces the number of necessary parts.

e) Reduced risk of bubbling: The combination of different modules and the reduction of tubing end therefore flow resistances like sharp edges or narrow radii also leads to a smoother flow. This avoids cavitation and the formation of bubbles f) Variability: Because of the reduction of tubing and the integration of different modules into one, the available space will be massively reduced. This allows to: Adapt the shape of the manifold to the according application or space requirements.
   a. Adapt the supply lines to the according application e.g. additional supply lines for starter reagents, cleaning solutions or compressed air
   b. Beside the geometric requirements, it is also possible to adapt the material of the manifold to the according application e.g. chemical resistance or light block ability g) Integrated functionalities: It is possible to integrate additional functionalities like the aspiration probe rinsing. This could be realized by generate an liquid flow around the probe and clean it by adhesion of the liquid (see also FIG. 3)

h) Reduced cost for design, assembling and service: The reduced amount of parts simplifies the effort for designing and assembling. The reduced number of spare parts simplifies the maintenance effort FIG. 1 shows exemplary an embodiment of multilayer unit. Valves are mounted to the upper layer.

The multilayer unit comprises the upper, middle and lower layer (50, 60, 70). It is obvious for a person having ordinary skill in the art that the multilayer unit can comprise more or less than three layers.

The upper layer 50 is connected to the inlet for the cleaning solution 5 as well as to the inlet for the rinsing solution 20 and the outlet for the rinsing solution 21. The aspiration probe 30 goes across all three layers through the aspiration probe guiding.

The valves 80 are arranged next to each other so that they can be placed above the cuvettes or reaction vessels 100 for controlling inlet of cleaning solution into the cuvettes 100. The aspiration probe 30 is responsible for aspirating the cleaning solution when the washing step is finished. Sensors 90 are used to control the inlet of cleaning solution in a sense that they measure the amount of liquid flowing through the injectors 91.

Figure 2A:
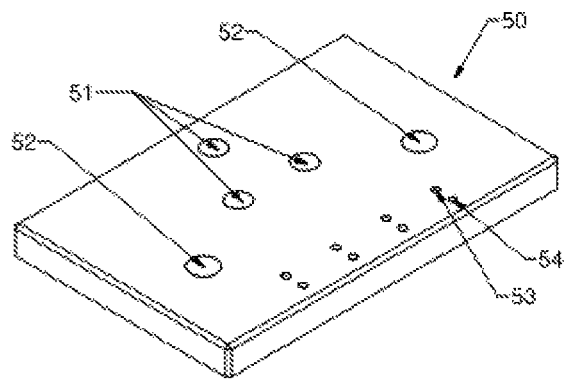
FIG. 2A is a top perspective view of an upper layer of a multilayer unit in accordance with a preferred embodiment of the present invention.

FIGS. 2A-2D depict in an exploded view of the three layers of the embodiment shown in FIG. 1. FIG. 2A shows the upper layer 50 with tubing sockets 51 and aspiration probe guiding 52. Bores for the inlet ports of valves 53 and for the outlet port of valves 54 are also shown.

Figure 2B:
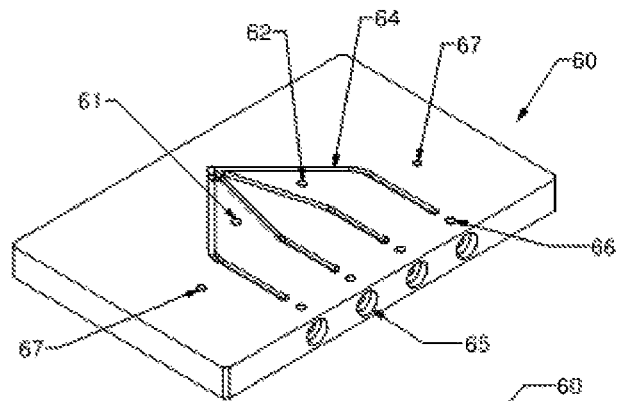
FIG. 2B is a top perspective view of a middle layer of a multilayer unit in accordance with a preferred embodiment of the present invention.
Figure 2C:
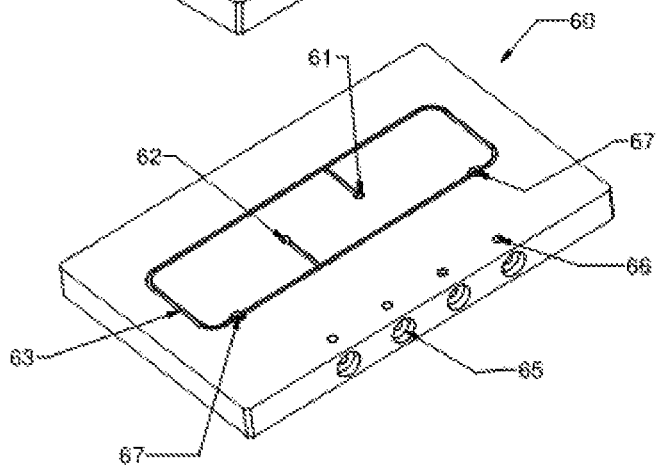
FIG. 2C is a bottom perspective view of a middle layer of a multilayer unit in accordance with a preferred embodiment of the present invention.

FIG. 2B shows a top view on the middle layer 60 and FIG. 2C a bottom view onto the middle layer as shown in FIG. 1. The middle layer comprises a rinsing solution channel 63, which encloses the aspiration probe guiding 67 so that the part of the aspiration probe (not shown) which is present in the aspiration probe guiding of this layer will get in contact with rinsing solution flowing in the rinsing solution channel from the rinsing solution inlet 61 to the rinsing solution outlet 62.

FIG. 2B shows the cleaning solution channel 64 on top of the middle layer, which is connected to the inlet port of valves 53 of the upper layer 50 (comp. FIG. 2A). The sensor bores 65 for arranging sensors directly next to the injector bores 66 are also depicted.

Figure 2D:
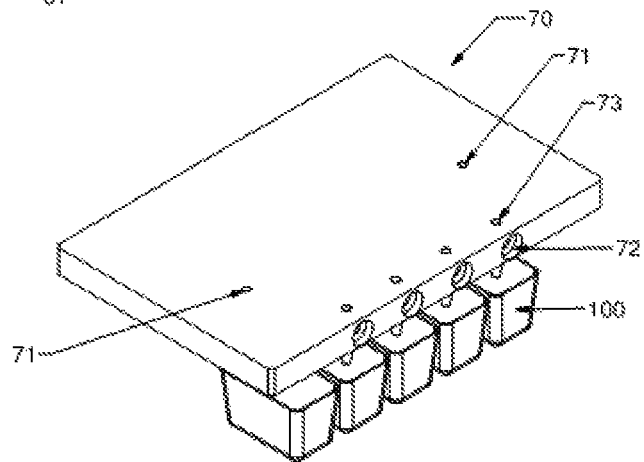
FIG. 2D is a top perspective view of a lower layer of a multilayer unit in accordance with a preferred embodiment of the present invention.

FIG. 2D shows the bottom layer 70 of the embodiment of FIG. 1 together with cuvettes being arranged directly below injector bores 73 for the injectors. This layer comprises sensor bores 72 for measuring liquid flow or flow rates. The aspiration probe guiding 71 crosses this layer too.

Figure 3A:
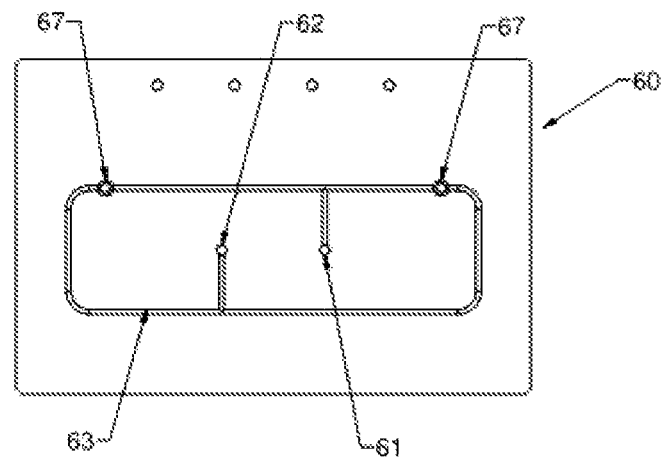
FIG. 3A is a bottom view of a middle layer of a multilayer unit in accordance with a preferred embodiment of the present invention.
Figure 3B:
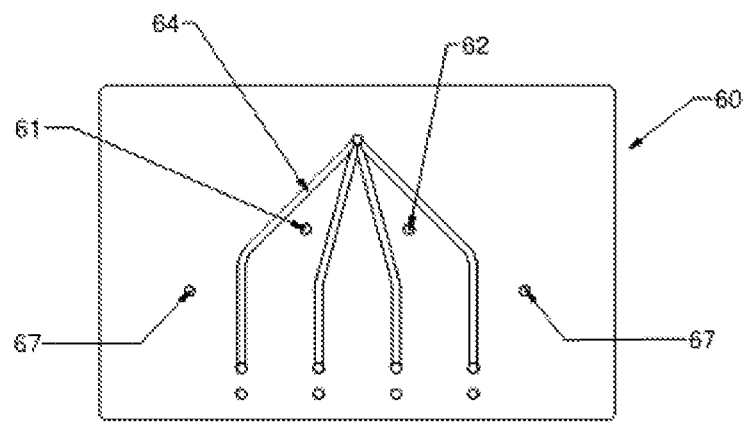
FIG. 3B is a top view of a middle layer of a multilayer unit in accordance with a preferred embodiment of the present invention.

FIG. 3B shows a top view on the middle layer 60 of the embodiment of FIG. 1. Basically, FIG. 3A shows on bottom of middle layer 60 the rinsing solution inlet 61, where rinsing solution enters the rinsing solution channel 63 (FIG. 3A) so that the rinsing solution can flush the aspiration probe that goes through aspiration probe guiding 67. After passing the aspiration probe (FIG. 3C) the rinsing solution leaves the multilayer unit through rinsing solution outlet 62.

The embodiment in FIG. 3B also shows the cleaning solution channel 64, which is arranged below the rinsing solution channel 63.

Figure 3C:
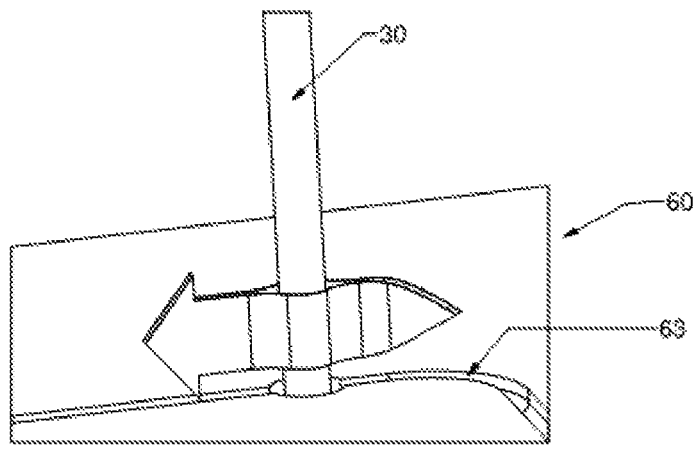
FIG. 3C is a schematic depiction of a rinsing solution flowing around an aspiration probe.

FIG. 3C depicts in more detail how the rinsing solution flowing in the rinsing solution channel 63 of a middle plate 60 flushes the aspiration probe 30. The arrow indicates the flow direction of the rinsing solution and shows that the rinsing solution flows around the aspiration probe 30 so that its outer surface will be cleaned.

Figure 4:
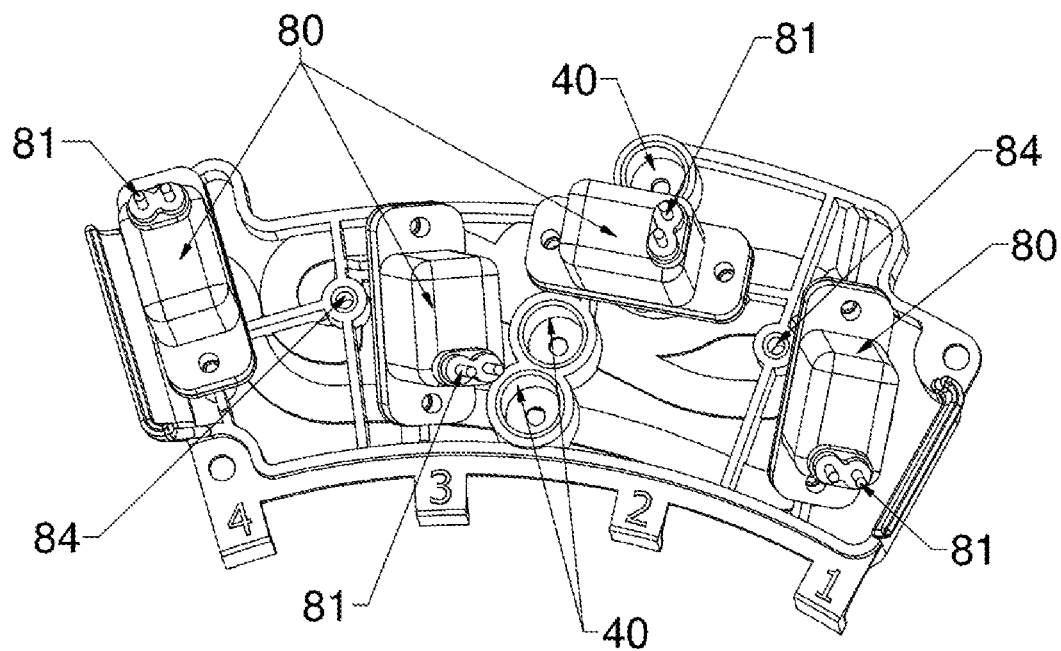
FIG. 4 is a top view of upper layer with valves in accordance with a preferred embodiment of the present invention.

FIG. 4 shows an upper layer 50 with four valves 80 fixed to it. The upper layer 50 is curved and thus adapted for washing probes being arranged in a round carousel for moving cuvettes or reaction vessels.

On top of the valves 80 are valve cables 81 arranged for providing power or connection the valves to the automated analyser system for actuating them. The aspiration probe guiding 84 goes also through the upper layer 50. Glue in sockets 40 are provided to take up supply lines for cleaning or rinsing solution.

Figure 5:
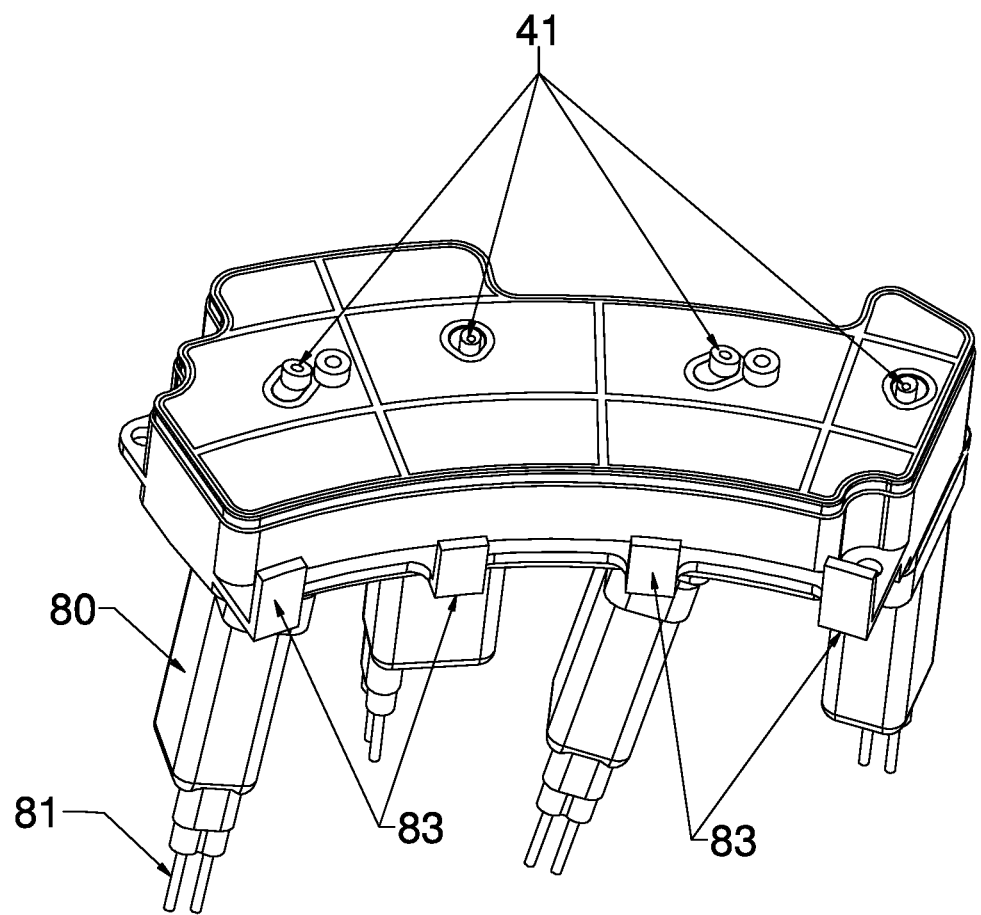
FIG. 5 is a bottom perspective view of multilayer unit with three layers in accordance with a preferred embodiment of the present invention.

FIG. 5 shows a bottom view onto a lower layer 70 with valves 80 being connected via valve cables 81 to the automated analyser system. Cable guiding 83 of the upper layer 50 are also provided.

The bottom of the lower layer 70 has four injector nozzles 41 for providing cleaning solution to the cuvettes (not shown).

Figure 6:
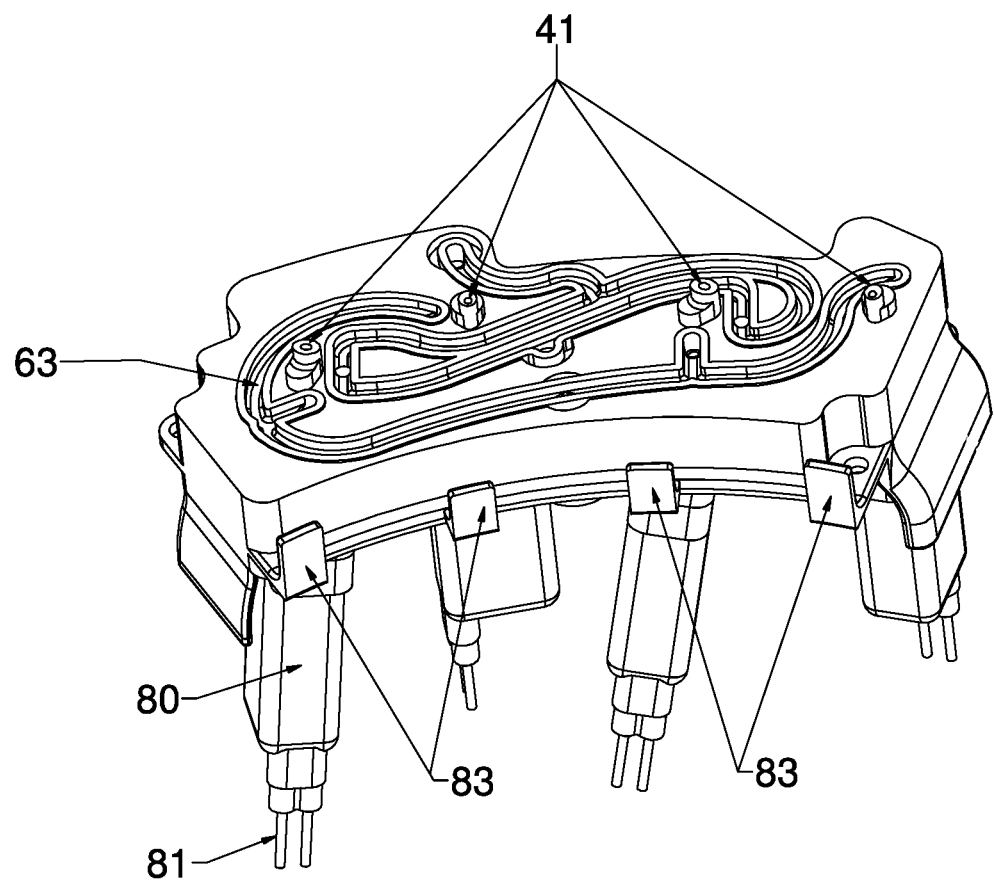
FIG. 6 is a bottom perspective view on multilayer unit in accordance with a preferred embodiment of the present invention without the lower layer.

FIG. 6 shows a middle layer 60 connected to an upper layer 50 or more precise an embodiment where upper and middle layer are formed in one part of a multilayer unit. Lower layer 70 is not connected to the upper/middle layer 60. Again, cable guiding 83 as well as valves 80 with valve cables 81 is shown. Rinsing solution channel 63 surrounds the injector nozzles 41.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 5 inlet cleaning solution
20 inlet rinsing solution
21 outlet rinsing solution
30 aspiration probe
40 glue in sockets for tubing
41 injector nozzle
50 upper layer
51 socket tubing
52 aspiration probe guiding
53 inlet port valves
54 outlet port valves
60 middle layer
61 rinsing solution inlet
62 rinsing solution outlet
63 rinsing solution channel
64 cleaning solution channel
65 sensor bore
66 injector bore
67 aspiration probe guiding
70 lower layer
71 aspiration probe guiding
72 sensor bore
73 injector bore
80 valve
81 valve cable
83 cable guiding
84 aspiration probe guiding
90 sensors
91 injector
100 cuvette/reaction vessel

What is claimed is:

1. A device for performing washing steps in automated analyzer systems, the device comprising:
 a multilayer unit with at least one layer, wherein the at least one layer of the multilayer unit comprises:
  at least one valve mounted to a first channel of the at least one layer, wherein the first channel is connected to at least one injector for injecting a washing buffer into a cuvette or vessel, and
  a second channel providing a rinsing buffer, wherein the second channel is separated from the first channel and encloses an aspiration probe which is movably arranged along its longitudinal axis within an aspiration probe guiding which is a bore in the at least one layer for cleaning the aspiration probe that was in contact with liquids from the cuvette or vessel.

2. The device of claim 1, wherein the multilayer unit comprises three layers, an upper layer, a middle layer and a lower layer.

3. The device of claim 1, wherein the at least one layer of the multilayer unit comprises tubing sockets and at least one inlet and outlet for the at least one valve.

4. The device of claim 1, wherein the at least one layer of the multilayer unit comprises an inlet and outlet connected to the second channel providing the rinsing buffer.

5. The device of claim 1, wherein the at least one layer of the multilayer unit comprises at least one injector connected to the at least one valve.

6. The device of claim 1, wherein the at least one layer comprises at least one acceptance for sensors adjacent to the bore.

7. The device of claim 1, wherein the at least one valve is fixed to the at least one layer of the multilayer unit.

8. The device of claim 4, wherein the at least one layer comprises openings for a tubing of washing buffer and the inlet and outlet of rinsing buffer.

9. The device of claim 1, comprising at least one sensor for measuring liquid amounts, flow rates, pressure, conductivity or temperature.

10. The device of claim 9, wherein the at least one sensor is integrated directly in the first channel between the at least one valve and the at least one injector.

11. A method for performing washing steps in an automated analyzer system, comprising the steps of
 a) providing a rinsing buffer for cleaning through a multilayer unit with at least one layer, wherein the at least one layer of the multilayer unit comprises:
  at least one valve mounted to a first channel of the at least one layer, wherein the first channel is connected to at least one injector for injecting a washing buffer into a cuvette or vessel; and
  a second channel for providing a rinsing buffer, wherein the second channel is separated from the first channel and encloses an aspiration probe which is movably arranged along its longitudinal axis within an aspiration probe guiding which is a bore in the at least one layer for cleaning the aspiration probe that was in contact with liquids from the cuvette or vessel;
b) aspiration of the washing buffer from the cuvette or vessel by at least one aspiration probe that is arranged movable across the multilayer unit;
c) moving the aspiration probe along their longitudinal axis through an aspiration probe guiding; and
d) cleaning the aspiration probe in the aspiration probe guiding by flushing the aspiration probe with the rinsing buffer.

12. The method of claim 11, additionally comprising the step of detecting liquid amounts, flow rates, pressure, conductivity or temperature with at least one sensor.

* * * * *